April 22, 1969 D. H. SMITH 3,440,627

DOMAIN WALL PROPAGATION DELAY LINE

Filed Oct. 21, 1965

INVENTOR
D. H. SMITH
BY Herbert M. Shapiro
ATTORNEY 3,440,627

DOMAIN WALL PROPAGATION DELAY LINE

David H. Smith, Summit, N.J., assignor to Bell Telephone Laboratories, Incorporated, New York, N.Y., a corporation of New York Filed Oct. 21, 1965, Ser. No. 499,849
Int. Cl. G11b 5/00
U.S. Cl. 340—174 7 Claims

ABSTRACT OF THE DISCLOSURE

The provision of an accelerating localized bias field at each of a plurality of output positions along a domain wall propagation delay line permits the period of delay for information in the channel to be varied without varying the output level.

This invention relates to magnetic circuits and, more particularly, to such circuits which generate a sequence of pulses in response to a signal.

Circuits which provide a sequence of pulses in response to a signal, commonly termed program generators, are well known in the art. Such program generators usually comprise a delay line in the form of a propagation medium along which information is advanced providing outputs in various output circuits coupled at fixed positions therealong. One problem universal to such program generators in particular and for most parallel output devices in general is the inability to drive logic circuitry in the absence of expensive sense amplifiers of which one is required for each output. Another problem is that it is difficult to vary the delay of such a delay line in a manner to provide a constant output pulse level.

One object of this invention is a program generator wherein output pulses are of sufficient amplitude to drive logic circuitry either in the absence of sense amplifiers or with amplifiers of considerably reduced complexity.

Another object of this invention is a variable program generator with a constant output pulse level.

The foregoing and further objects of this invention are realized in one specific embodiment thereof wherein a domain wall device is turned to account. A domain wall device, as is well known, comprises a magnetic material characterized by the ability to nucleate therein a stable reverse domain in response to a magnetic field greater than a characteristic nucleation threshold and by the ability to move the stable reverse domain therethrough in response to a magnetic field greater than a characteristic propagation threshold and less than the nucleation threshold. The magnetic material is conveniently in the form of a wire as described in copending application Ser. No. 405,692, filed Oct. 22, 1964 for D. H. Smith and E. M. Tolman now Patent No. 3,350,199. A reverse domain including leading and trailing domain walls is nucleated in the magnetic wire and expanded in response to a uniform magnetic field. The leading domain wall moves along the wire to induce pulses in a sequence of output conductors coupled to the wire. A bias voltage is applied across each output conductor to locally increase the magnetic field in the portion of the magnetic wire coupled thereby, thus accelerating the leading domain wall there for increasing the amplitude of the induced pulse in the output circuits. The timing between pulses is determined by the uniform propagation field independent of the locally augmented field at the outputs.

Accordingly, a feature of this invention is a domain wall device including a magnetic medium having coupled thereto a plurality of output circuits having biases impressed thereacross.

The foregoing and further objects and features in accordance with this invention will be understood more fully from a consideration of the following detailed description rendered in conjunction with the accompanying drawing, in which.

Figure 1:
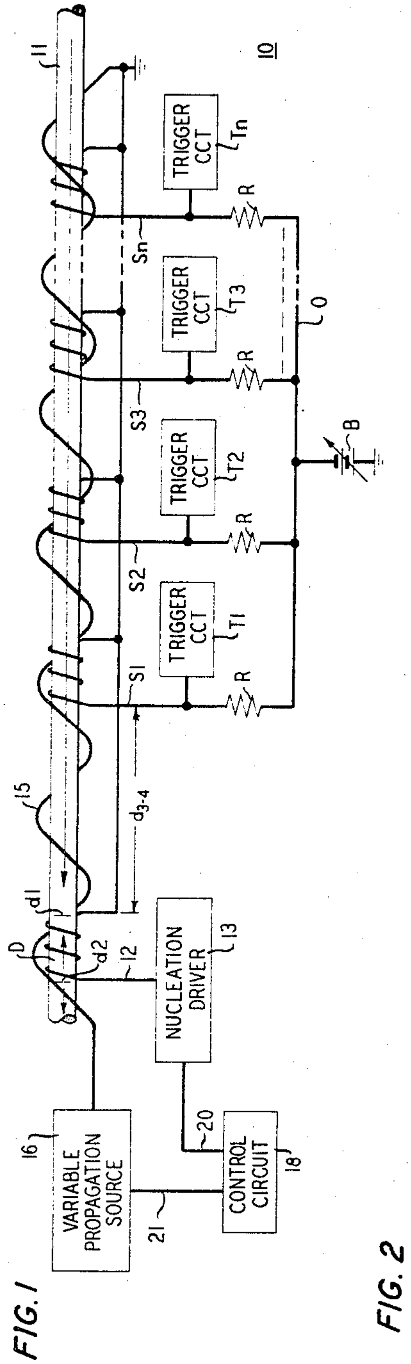
FIG. 1 is a schematic illustration of a program generator in accordance with this invention.

Specifically, FIG. 1 shows a program generator 10 in accordance with this invention. The program generator comprises, illustratively, a magnetic wire 11 to a first portion of which a conductor 12 is coupled. Conductor 12 is connected between a nucleation driver 13 and ground. A conductor 15 is also coupled to wire 11 along the entire length thereof. Conductor 15 is connected between a variable propagation source 16 and ground. A plurality of output (sense) conductors, designated S1, S2 . . . S*n*, are coupled to spaced apart positions along wire 11. The output conductors are connected, via corresponding decoupling resistors R, between a conductor, designated O, and ground. Conductor O is connected to the negative side of a battery B, the positive side of which is connected to ground. A plurality of trigger (logic) circuits, designated T1 . . . T*n*, are connected to conductors S1 . . . S*n*, respectively. Nucleation driver 13 and variable propagation source 16 are connected to a control circuit 18 via conductors 20 and 21, respectively. The various drivers, bias sources and other circuits herein may be any such elements capable of operating in accordance with this invention.

In the operation of the program generator 10 of FIG. 1, nucleation driver 13 applies a nucleation pulse to conductor 12 for nucleating a stable reverse domain D in a first portion of wire 11. The nucleation pulse is designated V*n* in the voltage versus time plot shown in FIG. 2. For purposes of this discription, wire 11 is assumed initialized to a forward (magnetized) direction represented by the arrows directed to the left in the representation of wire 11 in FIG. 1. A reverse (magnetized) domain is represented as an arrow directed to the right in FIG. 1 defining leading and trailing domain walls *d*1 and *d*2, respectively, with the forward domains.

The bias levels provided by propagation source 16 and battery B are assumed present at the time the nucleation pulse is applied. That time is designated *t*1 in FIG. 2. The biases supplied by the variable propagation source 16 and battery B, designated V16 and VB, respectively, in FIG. 2, generate a field of a polarity for moving the leading domain wall *d*1 to the right as viewed in the figure. A field of such polarity, negative for the coupling senses shown, moves the trailing domain wall *d*2 to the left in the wire 11.

Leading domain wall *d*1 advances along wire 11 sequentially passing the positions therein coupled by the output conductors S1 . . . S*n* inducing pulses therein of an amplitude determined by the number of turns of each output conductor and the velocity at which leading domain wall *d*1 passes the position coupled. The output pulses are designated P*o* in FIG. 2.

Figure 3:
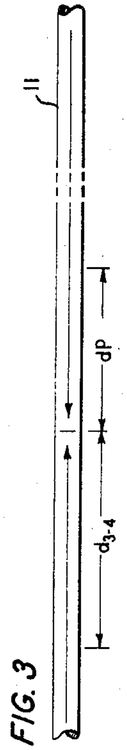
FIGS. 3 and 4 are schematic illustrations of a portion of the program generator of FIG. 1.
Figure 4:
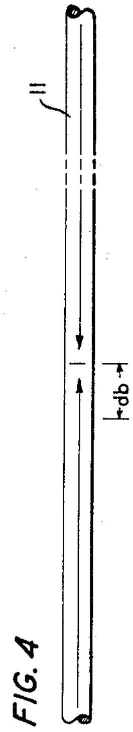

The amplitude of the field generated by the bias V16 determines the transit times for the leading domain wall *d*1 between its initial position and the first spaced apart position to which output conductor S1 is coupled and, also, determines the transit time for the domain wall between succeeding positions to which output conductors are coupled. The distance between that initial position and the first spaced apart position is designated *d*3–4 in FIG. 3 and corresponds to the time between the nucleation pulse, designated time *t*3 in FIG. 2, and the time of the first output pulse, designated time $t4$ in FIG. 2. The length of wire 11 coupled by an output conductor is designated $db$ in FIG. 4. The traversal time through that distance $db$ is designated $tb$ in FIG. 2 and corresponds to the output pulse width. The distance between the start of coupling at suceeding spaced apart positions is designated $dp$ in FIG. 3 and corresponds to the spacings between leading edges of succeeding output pulses. A representative such spacing is designated $tp$ in FIG. 2.

Figure 2:
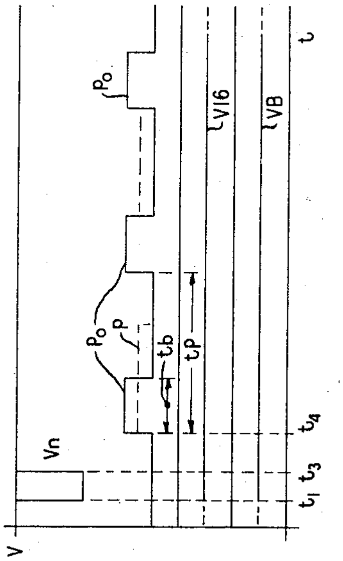
FIG. 2 is a diagram of pulses characteristic of the program generator of FIG. 1.

It is to be emphasized that, illustratively, bias V16 generates a substantially uniform magnetic field along the entire magnetic wire and so determines the time between $t3$ and $t4$ in FIG. 2 and, essentially, the times $tp$ as long as the duration of an output pulse is short compared to the time between pulses. An increase in that bias decreases the time at which the first output pulse appears after the nucleation pulse and also decreases the time between the output pulses. Illustratively, both biases V16 and VB, however, generate magnetic fields at the spaced apart positions coupled by the output conductors. Thus, the domain wall accelerates at those spaced apart positions. If, for example, $VB=V16$, then the domain wall sweeps through the length $tb$ of wire 11, coupled by each output conductor, in half the time it requires to traverse that length in the absence of bias VB. If the pulses P$o$ are considered to represent output pulses in the presence of biases VB and V16, then in the absence of bias VB (=V16) the amplitude of each of those output pulses is halved and the duration thereof is doubled. One such pulse is represented by the broken curve designated P in FIG. 2. The presence of the bias VB, however, affects the timing between (the leading edges of) succeeding output pulses only negligibly. That last-mentioned timing is primarily a function of the bias V16 for a given magnetic material. Thus, a simple variable delay line is provided wherein the amplitude of output pulses therefrom may be maintained substantially constant essentially independent of variations in delay. To this end, battery B is conveniently variable. Importantly, the biases VB and V16 together may not exceed the nucleation threshold for the magnetic wire. If such a threshold is exceeded thereby, unwanted reverse domains may be nucleated.

Resistances R in the output circuits are merely to decouple the output pulse on one sense conductor from the trigger circuit associated with another sense conductor. The resistance is chosen in a manner consistent with prior art teaching.

A delay line in accordance with this invention need not have conductor 15 coupling the entire magnetic wire 11 to provide a uniform field therein. Specifically, conductor 15 need not couple those spaced apart positions coupled by the output conductors. In such a case, the field at those spaced apart positions is due entirely to bias VB.

Thus, it has been shown that, within certain limits, the provision of a bias across an output conductor coupled to a magnetic wire accelerates the passage of a domain wall therethrough for increasing the amplitudes of output pulses induced thereby. After output pulses are provided in accordance with the foregoing, magnetic wire 11 is again initialized, conveniently by reversing the polarity of the bias from variable propagation source 16, readying the device for further operation.

It has been found that a bias of 5.0 milliamperes (1.6 oersteds) supplied by variable propagation source 16 accelerates the domain wall from $3\times10^4$ cm./sec. in the portions of wire 11 between the spaced apart positions coupled by output conductors to $1.4\times10^5$ cm./sec. or more in the speed apart positions. The bias supplied from source 16 may vary from 3.0 milliamperes to about 30 milliamperes for available magnetic material corresponding to a velocity range of $10^4$ to $10^5$ cm./sec. through the magnetic wire. For output conductors coupled to positions spaced apart 3.0 centimeters, output pulses are timed 300 to 30 microseconds apart. Output pulses for a 200 turn output conductor coupling have amplitudes of .02 to 0.2 volt and durations of 30 to 3 microseconds. A bias of 5 milliamperes (2.5 oersteds) supplied by battery B in accordance with this invention provides output pulses having amplitudes of, typically, .25 to .37 volt and durations of 2 to 1.5 microseconds also for a 200 turn output coupling, a range of amplitudes suitable for driving, for example, some monolithic semiconductor circuitry, in the absence of amplification.

Amplitudes of output pulses may be increased by additional turns in the output coupling. Additional turns require space, however. And space is provided only reluctantly in such devices. Moreover, impractical numbers of turns are required to provide suitable outputs. In terms of the specific operation ranges described above, for example, to increase the output amplitude from 0.2 volt to .37 volt by increasing the number of turns on the output conductor, 2000 rather than 200 turns would be required. This increase in the number of turns required is due to the fact that the output voltage increases proportionally to the number of turns on an output conductor only when those turns couple the magnetic wire over a length thereof equal to the length of the domain wall being propagated. Additional turns lengthen the output pulse if they are coupled beyond that length or are not fully coupled if they are within that length but overlying other turns.

Although the utility of a bias, in accordance with this invention, has been described in terms of a multiple output device, a single output device may benefit from the use of such a bias. One important example of this is in multiplexing with a "domain wall" device as described in the International Solid State Circuit Conference Digest of Technical Papers, Feb. 10–12, 1960, at page 24, in an article entitled "A Thin Magnetic-Film Shift Register," by K. D. Broadbent and F. J. McClung. In such a device a reverse domain is propagated simultaneously in a four-phase step-along fashion through each of four magnetic wires of unequal length. A single output conductor couples the wires serially in stepped fashion such that the domains in succeeding wires induce pulses therein during each phase of propagation. In such an arrangement, the leading wall of the domain in the third wire passes the output coupling at the same time the trailing wall of the reverse domain in the first wire passes the output coupling there. Consequently, equal and opposite pulses are induced in the output conductor at that time providing negligible output signals. A bias on the output conductor, in accordance with this invention, however, accelerates leading walls and retards trailing walls of reverse domains. Thus, in the troublesome situation described, the pulse induced by a leading wall is peaked and the pulse induced concurrently by the trailing wall of a reverse domain in another wire is diminished. A significant output signal is provided.

What has been described is considered to be only illustrative of the principles of this invention and various modifications may be made therein by one skilled in the art without departing from the scope and spirit of the invention.

What is claimed is:

1. In combination, a medium along which a discontinuity may be advanced in response to a first megnetic field having a first polarity, means for initiating said discontinuity at a first position in said medium, means for providing said first magnetic field of said first polarity in said medium for moving said discontinuity from said first to a second spaced apart position in a preset time, output means coupled to said medium at said second spaced apart position, and means for providing a relatively large second magnetic field of said first polarity locally at said second spaced apart position in a manner to provide an increased output there while altering said preset time only negligibly.

2. In combination, a domain wall device including a magnetic medium, means for nucleating therein a first magnetic state including a domain wall, a plurality of outputs coupled to spaced apart positions in said magnetic medium, means for providing a first field of a first polarity for advancing said domain wall along said medium at a first rate sequentially through said spaced apart positions in a preset time, and means for providing a second field also of said first polarity for advancing said domain wall at a second rate faster than said first rate at each of said spaced apart positions while altering said preset time only negligibly.

3. A combination in accordance with claim 2 wherein said magnetic medium comprises a magnetic wire capable of maintaining therein said first magntic state in response to a nucleation field in excess of a nucleation threshold and of moving that first magnetic state therein in response to said first field in excess of a propagation threshold and less than said nucleation threshold.

4. A combination in accordance with claim 3 wherein said means for nucleating comprises a conductor coupled to a first portion of said magnetic wire for providing said nucleation field there.

5. A combination in accordance with claim 4 wherein said means for advancing said domain wall at a first rate comprises a conductor coupled to said magnetic wire for providing said first field therealong.

6. A combination in accordance with claim 5 wherein said means for advancing said domain wall at a second rate comprises means for applying a bias voltage across each of said outputs.

7. A domain wall device including a magnetic medium having an output conductor coupled to a portion thereof, means for providing in said medium a field of a first polarity to propagate domain walls through said medium in a preset time, and means coupled to said output conductor for impressing a bias thereacross to provide a localized second field of said first polarity for accelerating domain walls propagated through said medium locally altering said preset time only negligibly.

References Cited

UNITED STATES PATENTS 3,090,946 5/1963 Bobeck ------------ 340—174

OTHER REFERENCES

Hass, Georg. Physics of Thin Films, Academic Press, Volume 1, 1963. Pg. 316–7,

BERNARD KONICK, *Primary Examiner.*

G. M. HOFFMAN, *Assistant Examiner.*